US012446500B2

(12) United States Patent
Carey et al.

(10) Patent No.: US 12,446,500 B2
(45) Date of Patent: Oct. 21, 2025

(54) SPEED CONTROL FOR IRRIGATION SYSTEMS

(71) Applicant: Reinke Manufacturing Co., Inc., Deshler, NE (US)

(72) Inventors: Josiah John Carey, Deshler, NE (US); Drew Ryan Eirich, Bruning, NE (US); Jonathan E. Ireland, Hebron, NE (US); Russell Scott Reinke, Davenport, NE (US)

(73) Assignee: Reinke Manufacturing Co., Inc., Deshler, NE (US)

( * ) Notice: Subject to any disclaimer, the term of this patent is extended or adjusted under 35 U.S.C. 154(b) by 1174 days.

(21) Appl. No.: 16/926,319

(22) Filed: Jul. 10, 2020

(65) Prior Publication Data

US 2022/0007596 A1 Jan. 13, 2022

(51) Int. Cl.

*A01G 25/16* (2006.01)
*A01G 25/02* (2006.01)
*A01G 25/09* (2006.01)

(52) U.S. Cl.

CPC ........... *A01G 25/165* (2013.01); *A01G 25/02* (2013.01)

(58) Field of Classification Search

CPC ..... A01G 25/092; A01G 25/165; A01G 25/02
See application file for complete search history.

(56) References Cited

U.S. PATENT DOCUMENTS

| | | | | |
|---|---|---|---|---|
| 6,512,992 | B1 * | 1/2003 | Fowler | A01B 79/005 702/155 |
| 7,584,053 | B2 * | 9/2009 | Abts | A01G 25/16 701/485 |
| 9,342,076 | B2 * | 5/2016 | Malsam | G05D 1/0278 |
| 9,459,628 | B1 * | 10/2016 | Abts | A01G 25/092 |
| 9,643,196 | B2 * | 5/2017 | Klinefelter | B05B 12/04 |
| 10,120,393 | B1 * | 11/2018 | Klawinski | G05B 19/042 |
| 11,432,483 | B2 * | 9/2022 | Ricketts | B05B 12/085 |
| 2002/0008167 | A1 * | 1/2002 | Haberland | A01G 25/167 239/722 |
| 2006/0027677 | A1 * | 2/2006 | Abts | A01G 25/092 239/69 |
| 2009/0216410 | A1 * | 8/2009 | Allen | G05D 1/0278 701/50 |
| 2010/0032493 | A1 * | 2/2010 | Abts | A01G 25/092 239/11 |
| 2010/0032495 | A1 * | 2/2010 | Abts | A01G 25/092 239/69 |
| 2011/0248104 | A1 * | 10/2011 | Malsam | A01G 25/092 239/723 |
| 2012/0053776 | A1 * | 3/2012 | Malsam | A01G 25/092 239/744 |
| 2013/0048747 | A1 * | 2/2013 | Pfrenger | A01G 25/092 239/723 |
| 2013/0211717 | A1 * | 8/2013 | Abts | A01G 25/092 701/485 |

(Continued)

*Primary Examiner* — Joseph A Greenlund

(74) *Attorney, Agent, or Firm* — Shook, Hardy & Bacon L.L.P.

(57) ABSTRACT

A speed-control system for an irrigation system may detect when an actual speed of the irrigation system is faster or slower than a target speed of the irrigation system. In some instances, the speed-control system may detect when the actual speed is faster or slower at discrete virtual points of interest and execute compensatory measures.

20 Claims, 6 Drawing Sheets

(56) References Cited

U.S. PATENT DOCUMENTS

| | | | | |
|---|---|---|---|---|
| 2013/0341419 | A1* | 12/2013 | Pfrenger | A01G 25/097 239/743 |
| 2016/0014982 | A1* | 1/2016 | Malsam | A01G 25/16 239/73 |
| 2017/0105370 | A1* | 4/2017 | Abts | G05B 15/02 |
| 2017/0156273 | A1* | 6/2017 | Whalley | B05B 1/20 |
| 2017/0295730 | A1* | 10/2017 | Abts | A01G 25/092 |
| 2017/0349060 | A1* | 12/2017 | Abts | A01G 25/092 |
| 2018/0054982 | A1* | 3/2018 | Whalley | A01G 25/16 |
| 2018/0310496 | A1* | 11/2018 | Andrews | G05B 15/02 |
| 2019/0239457 | A1* | 8/2019 | Ricketts | A01G 25/16 |
| 2019/0350145 | A1* | 11/2019 | Kastl | A01G 25/16 |
| 2020/0315109 | A1* | 10/2020 | Rempe | A01G 25/16 |
| 2021/0007298 | A1* | 1/2021 | Thatcher | A01G 25/092 |
| 2021/0022302 | A1* | 1/2021 | Ricketts | B05B 12/087 |
| 2021/0076579 | A1* | 3/2021 | Thatcher | A01G 25/16 |
| 2022/0007596 | A1* | 1/2022 | Carey | A01G 25/02 |
| 2022/0338429 | A1* | 10/2022 | Roth | A01G 25/167 |
| 2023/0210067 | A1* | 7/2023 | Miller | A01G 25/16 239/731 |

* cited by examiner

SPEED CONTROL FOR IRRIGATION SYSTEMS

TECHNICAL FIELD

This disclosure relates to adjusting the speed of an irrigation system.

BACKGROUND

One purpose of an irrigation system (e.g., center-pivot or lateral-move) is to distribute water within a field of interest, and in some instances, chemicals, fertilizers or other additives may also be applied. It is common for a desired application rate to be set at the commencement of the irrigation cycle, such that a positional target of the system (e.g., position at the end of the cycle) may be important to ensure both enough additive is available to complete the irrigation cycle and the correct additive application rate is achieved. Some systems also permit a field to be sub-divided into field segments, and different application prescriptions or rates may be set for each field segment.

Irrigation systems typically include some type of drive mechanism that self-propels the system across a field. Although a target or pre-set speed of the drive mechanism (e.g., 6 ft/min) may be automatedly controlled (e.g., based on the specified application rate), the actual speed may differ as a result of various factors. For example, the terrain may include an uphill traverse or wetter conditions that impede or hinder travel, or may include a downslope that accelerates travel. The actual speed at which the irrigation system traverses a field may affect the application rate. For example, under the same dispersion conditions (e.g., flow rate, sprinkler settings, etc.), faster speeds will result in lower application rates, whereas slower speeds will result in higher application rates. Running short of additive is highly undesirable and the over application of additives (or under application) can be detrimental to the crop.

SUMMARY

At a high level, some aspects of this disclosure are directed to detecting when the actual speed of an irrigation system differs from the target speed and adjusting the drive mechanism accordingly. For example, the speed may be adjusted in the middle of a cycle to improve the likelihood that a desired application rate will be achieved. This summary is provided to introduce a selection of concepts in a simplified form that are further described below in the detailed description. This summary is not intended to identify key features or essential features of the claimed subject matter, nor is it intended to be used in isolation in determining the scope of the claimed subject matter.

BRIEF DESCRIPTION OF THE SEVERAL VIEWS OF THE DRAWINGS

Some aspects of this disclosure are described in detail below with reference to the figures that are submitted together with this detailed description. The figures are incorporated herein by reference in their entirety, and a brief description of each figure is provided directly below.

DETAILED DESCRIPTION

Figure 1:
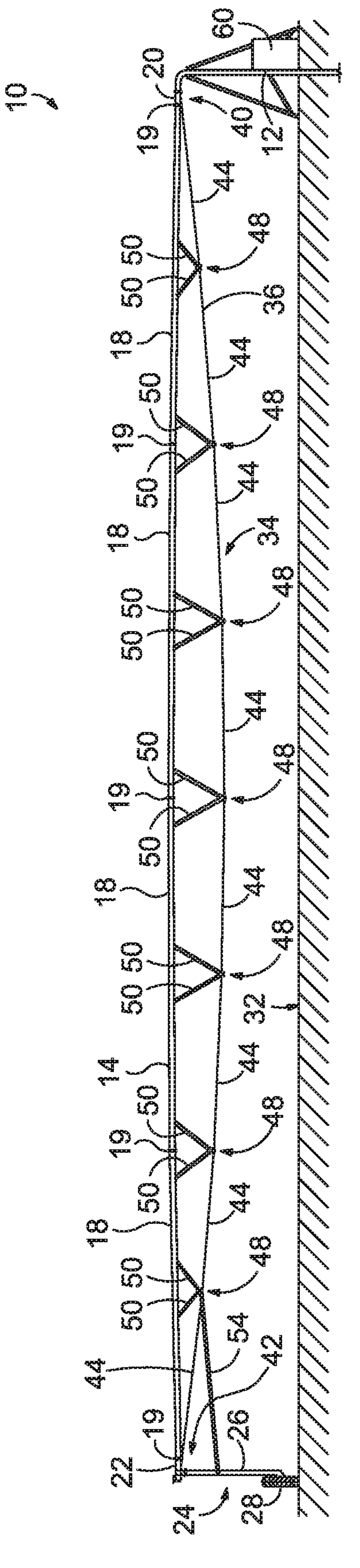
FIG. 1 depicts a front elevation view of an irrigation system in accordance with an aspect of this disclosure.

Subject matter is described throughout this disclosure in detail and with specificity in order to meet statutory requirements. The aspects described throughout this disclosure are intended to be illustrative rather than restrictive, and the description itself is not intended necessarily to limit the scope of the claims. Rather, the claimed subject matter might be practiced in other ways to include different elements or combinations of elements that are similar or equivalent to the ones described in this disclosure and that are in conjunction with other present, or future, technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by, and is within the scope of, the claims.

At a high level, aspects herein are directed to an irrigation system that executes an irrigation-system compensatory measure (e.g., adjusts speed, flow rate, etc.) at pre-determined virtual points of interest. That is, in the present disclosure a field of interest is divided into virtual points of interest. The present disclosure includes determining system parameters (e.g., speed, direction of travel, variance, etc.) at one or more of the virtual points of interest (e.g., at each virtual point of interest), and if necessary, taking some compensatory to improve a likelihood that a desired application rate is achieved. For example, if a field of interest is a full circle system, then the field of interest may be divided into discrete points of interest at each $1/10^{th}$ of one degree (e.g., 360 degrees in the field of interest×10 discrete points of interest per degree=3600 discrete points of interest for the field of interest). The system of the present disclosure may determine system parameters at one or more of the 3600 discrete virtual points of interest (or more or fewer depending on how the field of interest is divided). Similarly, if a field of interest is treated using a lateral-move system, then the field may be divided into linear segments at pre-determined virtual points of interest (e.g., one-foot increments), and system parameters may be checked at one or more of the virtual points of interest (e.g., at each virtual point of interest).

In this manner, the present disclosure provides a position-based control. This is in contrast to some conventional approaches that may check and adjust a speed of an irrigation system at predetermined time intervals. Because conventional systems rely on time intervals, a physical position of the irrigation system is variable and uncertain when parameters are checked and the system actual speed does not match the target speed. Among other things, this can make it difficult to adhere to position-based prescriptions (e.g., varied application rates at different segment of a field). In contrast, by checking parameters at predefined virtual positions, the system of the present disclosure improves adherence to position-based prescriptions. In addition, because in conventional systems a position of the irrigation system when parameters are checked may be variable from one cycle to the next, it is challenging for the system to learn and improve over a plurality of cycles based on collective data (e.g., since the position of the system of at a particular parameters check may not be the same in a subsequent cycle). In contrast, because the position at which the system checks parameters is consistent from one cycle to the next, the system of the present disclosure can learn over time across a plurality of cycles.

Having described some aspects of this disclosure at a high level, reference is now made to FIG. 1 illustrating an example of an irrigation system 10. The illustrated irrigation system 10 is a section of a center-pivot type irrigation system that revolves or rotates around a fluid source 12, and in other aspects, irrigation system may be a linear or lateral-move irrigation system, or any other type of irrigation system. In accordance with aspects of this disclosure, a speed adjustment system may be included in an irrigation system that is similar to the irrigation system 10 of FIG. 1 or that varies from the irrigation system depicted in FIG. 1.

The illustrated irrigation system 10 includes a pipeline 14 coupled to the fluid source 12. The pipeline 14 extends from the fluid source 12 to a tower 24. The pipeline 14 may comprise a plurality of pipe segments 18 coupled to one another, or to other segments, at pipe junctions 19. In other aspects, the pipeline 14 may comprise a single pipe segment. The pipeline 14 may include one or more different types of sprinklers for dispersing various applications on a field.

A first segment 20 of the pipeline 14 may connect to the fluid source 12 with a span coupling. The first segment 20 may include the span coupling, or a portion of the span coupling (e.g., a hook), for detachably coupling to the fluid source 12. The span coupling may comprise a hook-and-receiver-type span coupling. For example, the first segment 20 may include a hook that may be detachably coupled to a receiver (e.g., a ring) connected to the fluid source 12. Such a span coupling may provide a highly efficient point of rotation for the pipeline 14 when placed in the center of the pipeline 14.

In the illustrated aspect, the pipeline 14 is capped at a last segment 22. It may be advantageous in some aspects, however, to provide a multi-span irrigation system to permit irrigation of a greater area. For example, the irrigation system 10 may comprise a first span and a second irrigation system may comprise a second span, an ancillary span, or a swing arm that may be attached to the first span. Thus, the multi-span irrigation system may be composed of two or more irrigation systems (e.g., the irrigation system 10). In this example, the second span, ancillary span, or swing arm may be coupled to the last segment 22 of the pipeline 14 of the irrigation system 10 to increase the area over which the combined irrigation system travels. Thus, the last segment 22 of the pipeline 14 may include a span coupling (e.g., a hook and a receiver), or a portion of a span coupling, (e.g., a receiver) for connecting to a span coupling (e.g., a hook) of the second span, ancillary span, or swing arm. Hook-and-receiver-type span couplings are preferred, but other types of span couplings may also be useful with the present invention.

The tower 24 supports the last segment 22 of the pipeline 14. In other aspects, the tower 24 may support an intermediate portion of the pipeline 14 resulting in a portion of the pipeline 14 cantilevered past the tower 24. The tower 24 includes one or more support legs 26 and one or more wheels 28. In some aspects, the tower 24 is self-propelled and includes a drive unit that causes the wheels to rotate to carry the pipeline 14 over a field 32. In other aspects, other equipment (e.g., electronics) may be mounted on the tower 24, such as for controlling the drive unit.

Furthermore, the irrigation system 10 includes a control panel 60 for controlling operations of the irrigation system, such as by sending control signals to the drive unit on the tower 24 (e.g., to control speed), to a pump (e.g., to control flow rate), etc. The control panel 60 is illustrated affixed near the center pivot, and in other aspects, the control panel 60 may be affixed to other parts of the irrigation system 10. The control panel 60 may include a user interface (e.g., graphical user interface) for receiving inputs (e.g., application rate) from a user to control operations of the irrigation system 10. In other aspects, the control panel 60 may include a communications interface for sending and receiving signals (e.g., wireless signals or wired signals). As such, the control panel 60 may wirelessly receive user input remotely and may wirelessly send data (e.g., measured speeds, speed variance, etc.) to a remote location (e.g., server, user computing device, etc.).

A truss system 34 includes a first truss rail 36 and a second truss rail (obscured from view in FIG. 1 on the other side of the system 10). In some aspects, a truss system may include only one truss rail. In other aspects, the truss system may include more than two truss rails. The first truss rail 36 and the second truss rail are substantially similar and the following description of the first truss rail 36 applies equally to the second truss rail. A first end 40 of the first truss rail 36 is coupled to the first segment 20 of the pipeline 14. Likewise, a second end 42 of the first truss rail 36 is coupled to the last segment 22 of the pipeline 14. The first truss rail 36 includes a plurality of headed truss rods 44 coupled end-to-end between a pair of cooperating mating members at each of one or more intermediate joints 48.

The truss system 34 includes a plurality of pairs of struts 50 extending from the pipeline 14 with which they are coupled via conventional means (e.g., fastened to a plate that is welded to the pipeline 14). Each pair of struts 50 additionally is coupled to each other at one of the intermediate joints 48. The truss system 34 further includes a plurality of cross-members that are also obscured from view and that extend from one of the intermediate joints 48 of the first truss rail 36 to an intermediate joint of the second truss rail and spaces the intermediate joints, and thereby the first and second truss rails apart. In the illustrated embodiment, a brace 54 also extends from the tower 24 to one of the intermediate joints 48 to provide additional support and to stabilize the tower 24. In some aspects, one or more of the intermediate joints may comprise flying joints that do not have a strut 50, a cross-member 52, or a brace 54 attached. Thus, these flying joints include only adjacent truss rods 44 coupled end-to-end between the pair of cooperating members.

Using the control panel 60, a desired application rate may be set at the commencement of an irrigation cycle for a field or for one or more individual segments of a field. The application rate may then be used to determine a target speed. In some instances, this may be controlled by varying the duty cycle of the control signal that is sent to the last tower 24 on the irrigation system. For example, the last tower 24 is considered the control tower based on the mechanical and electromechanical functions. The command to this tower may be a sixty second duty cycle where the duty can be adjusted based on the percentage timer setting where 100% is always on for the entire sixty second cycle and 50% is thirty seconds on thirty seconds off. A command "on" signal engages the tower motor circuit propelling the system. When no command is signal is present the motor circuit is disengaged and the system movement ends. As such, adjusting duty cycle percentage directly correlates to the amount of applicant dispersed on the field of interest.

Although a target or pre-set speed of the drive mechanism (e.g., 6 ft/min) may be automatedly controlled (e.g., based on the specified application rate), the actual speed may differ as a result of various factors (e.g., the rate of application can be skewed due to environmental conditions). For example, a system may be required to pass through marsh like terrain or low-lying areas that may have collected an abundance of moisture making it difficult to traverse. The wheels 28 may slip through this area. The irregularity in movement, or as previously correlated with the speed of the system, affects the application amount. Another example of irregularity in speed is traversing undulating terrain. A descent may cause the system to move faster and an ascent to move slower. All of which, affect the speed of travel through those parts of the field. The actual speed at which the irrigation system traverses a field may affect the application rate. For example, under the same dispersion conditions (e.g., flow rate, sprinkler settings, etc.), faster speeds will result in lower application rates, whereas slower speeds will result in higher application rates. As such, some aspects of this disclosure are directed to detecting when the actual speed of an irrigation system differs from the target speed and adjusting the drive mechanism (or executing some other irrigation-system compensatory measure).

An aspect of the present disclosure, provides a system that is both reactive and predictive in compensating for, and overcome the effects of, environmental challenges while the irrigation system travels toward the desired target. That is, the system is reactive by checking parameters at predefined positions, and if necessary, making adjustments (e.g., to speed) mid-cycle. In a further aspect, the system is predictive by tracking results over time (e.g., variance at one or more positions), recognizing patterns, and if necessary, making adjustments to the system.

Figure 2:
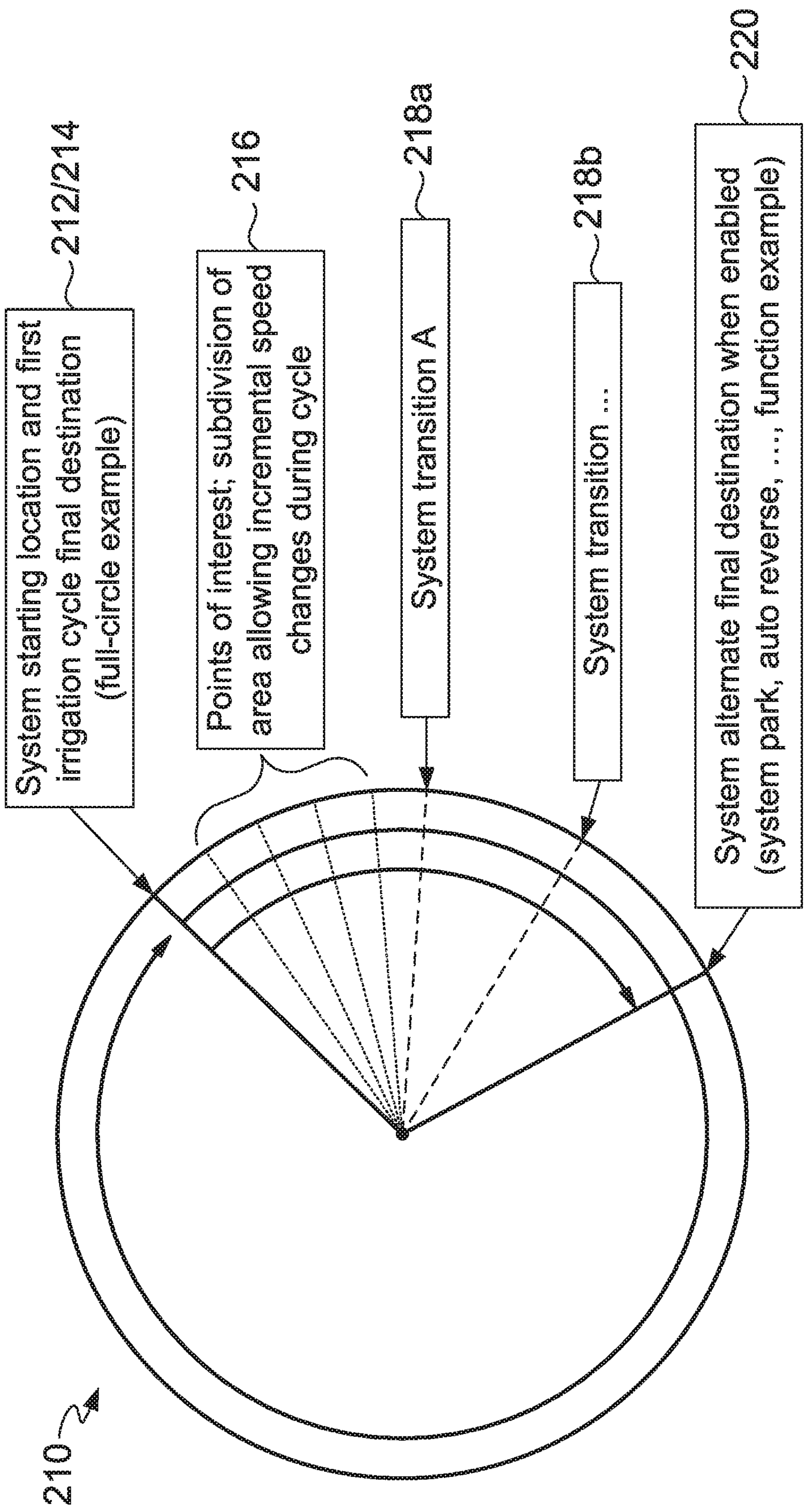
FIG. 2 depicts a schematic diagram of a field of interest that may be treated using an irrigation system in accordance with an aspect of this disclosure.

Referring to FIG. 2, FIG. 2 illustrates a diagram of a field of interest 210 in accordance with an aspect of the present disclosure. The field of interest 210 includes various elements, such as a starting location 212, a final destination 214, points of interest 216, system transitions 218*a* and 218*b*, and an alternate final destination 220.

In an aspect of the present disclosure, the starting location 212 may include a location at which the system starts an irrigation cycle. This could be at any particular degree for center pivots or at any particular distance for lateral moves. In a further aspect of the present disclosure, the final destination 214 may include a location at which the system ends the irrigation cycle. In the example of a center pivot with 360 degree rotational movement, the final destination is the starting location of the irrigation cycle. In the example of a center pivot with less than 360 degrees of movement and a lateral move system type, the final destination may defaults to the next available barricade (e.g., physical or virtual).

The points of interest 216, in accordance with another aspect, may include virtual delineations or divisions between segments or subdivisions of the field of interest. For example, for a center pivot, the points of interest may include the subdivision of the system's rotational movement into incremental delineations, such as 1 degree increments or similar. For a lateral move, the points of interest may include the subdivision of the system's linear movement into incremental delineations, such as 1 foot increments or similar. In both a center pivot system and a lateral move system, a method of the present disclosure may be executed at one or more points of interest. FIG. 2 depicts four points of interest along a portion of the field of interest 210, and in other aspects points of interest may be positioned radially around additional portions of the field 210 (e.g., entirely around the field).

In accordance with another aspect, a system transition 218*a* and 218*b* may include a predefined position that effects a change to the system's operating parameters such as, but not limited to, change in flow rates, turning on or off an auxiliary devices, enabling a program and the like. A plurality of system transitions is contemplated, in which case the system could have any number of transitions throughout the irrigation cycle. In a further aspect, the system alternate final destination 220 may include a position at which the system may have an option to end an irrigation cycle before the system reaches the starting location or barricades as previously mentioned. Examples of an alternate final destination include a system park, electronic barricades including an auto-stop at barricade or auto-reverse at barricade with the later beginning a second irrigation cycle or a program containing the disengagement of this method at a predetermined position and the like.

In an embodiment, the field of interest is divided into a plurality of points of interest with corresponding coordinates in degrees (or feet in the case of a lateral move). These points of interest can be set, by way of example, to one degree or any fraction of a degree, around the entire rotational movement of the system. It is typical to have 360 degrees of available rotational movement on a system or in the case of a lateral move system, operating linearly through the field of interest, the distance it can move about is subdivided into a plurality of points of interest. Other types include less than 360 degree rotation however, in all cases, a plurality of points of interest has been contemplated whether that be linear distance or rotational degrees.

In a further embodiment, on an irrigation cycle (e.g., the first irrigation cycle after an application rate has been input) the system may set the target speed based on the input parameters (e.g., desired application depth). In addition, based on the target speed, the system may estimate the time at which it should arrive at a point of interest associated with the field of interest (e.g., the time at which the system should arrive at the final destination, at one or more points between the start and the final destination, at all points between the start and the final destination, etc.). Furthermore, prior to initiating the cycle, the system may determine the direction in which the irrigation system will be moving (e.g., forward or reverse).

Upon arrival at the first point of interest, a first record may be created containing the time of arrival and direction of travel. This first record may be used in various manners. For example, the first record may be used to determine how the irrigation-system actual speed compares to the target speed. For instance, to compare the actual speed and the target speed, the first record may be used together with historical data, independently of historical data, together with other data of the same cycle, or any combination thereof. Based on this assessment, the system parameters (e.g., speed, flow rate, etc.) may be adjusted; the record may be stored for subsequent processing (e.g., combining with data collected at later segments within that same cycle, combining with data collected in later cycles, etc.); or any combination thereof.

Various operations may be performed at each point of interest, and an example of the types of data that may be recorded by the system is provided directly below in Table 1: Single Cycle Data.

TABLE 1

| Single Cycle Data | | | | | | | |
|---|---|---|---|---|---|---|---|
| Point of Interest | Initial Est. Arrival | Est. Section Duration | Actual Arrival | Actual Section Duration | Updated Est. Arrival | Cycle Difference | Sector Difference |
| 0 - Start | 07:00:00 | | | | | | |
| 1 | 07:03:00 | 00:03:00 | 7:03:10 | 00:03:10 | 07:03:00 | −0:00:10 | −0:00:10 |
| 2 | 07:06:00 | 00:03:00 | 7:06:15 | 00:03:05 | 7:06:10 | −0:00:15 | −0:00:05 |
| 3 | 07:09:00 | 00:03:00 | 7:09:15 | 00:03:00 | 7:09:15 | −0:00:15 | 0:00:00 |
| 4 | 07:12:00 | 00:03:00 | 7:12:26 | 00:03:11 | 7:12:15 | −0:00:26 | −0:00:11 |
| . . . | . . . | . . . | . . . | | | | |
| End | 09:00:00 | | | | | | |

In an embodiment, the system may operate by using records from a current irrigation cycle, without necessarily taking into account records from prior cycles. For example, the start of the irrigation cycle may be logged and the final destination and estimated arrival time is determined (e.g., as previously described). In some embodiments, the estimated arrival time may be adjusted (e.g., increased) to account for system transitions, which may introduce time delays as the irrigation system traverses through a cycle.

For example, at a first point of interest, the system may compute the variance of the predicted time of arrival and the actual time of arrival. Subsequently, upon arrival at the second point of interest, a second record may be created and the computing routine creates a variance between the predicted time of arrival and the actual time of arrival. With a compilation of subsequent records, a trend may be established and the system may adjust system speed toward the third point of interest by modifying the control speed output, or duty cycle, that the last tower is engaged. At each subsequent point of interest, the system may use the average of all historical records during the irrigation cycle. Or, at each subsequent point of interest, the system may consider the variance at a single point of interest. In other words, calculations may be executed at each point of interest, at each section, or any other position between the starting location and the final destination. For example, referring to Table 1, the system may adjust the system based on the Cycle Difference determined at one or more of the points of interest.

Using this approach, estimated time of arrival may become highly accurate, as compared with conventional approaches, since assessments are selectively made at predetermined, user-defined positions throughout the entire course of the irrigation cycle. For instance, once the system has arrived at the first point of interest, the system may determine whether it arrived on time, ahead of time, or behind time. Based upon the result, the system may adjust or maintain the systems control signal as it approaches the second point of interest. The system may then run at each subsequent point of interest and make speed adjustments toward the next point of interest whenever necessary (e.g., based upon the last recorded variance). At one or more subsequent points of interest (e.g., at every point of interest), the system may execute an assessment to determine if system changes should be made to achieve the final destination on time. Table 1 shows one example of how variance calculations may include the actual difference in time, however, this could also be stored as the percentage of speed using the time divided by speed (i.e., the speed at which the system entered the point of interest).

In an embodiment, when calculating speed adjustments, various parameters may be weighted. For example, more emphasis may be placed upon the last recorded variance and less on the historical average making a distinction between the two during computation. A rolling average, or an average that only looks back at a limited number of records is also contemplated thus limiting the data that can invoke change to only the records within the rolling window, or in other words, only within that area in the field. In another embodiment, the weights placed upon the last recorded and historical variances can be any combination. In any case, both the historical and last recorded variance may be used in computing an amount of adjustment suggested to arrive on-time at the next point of interest.

In a further embodiment, the system may use historical recorded data (e.g., over a plurality of cycles) to predictively adjust the systems speed. For example, records may be maintained over the life of the system, and an example of the types of data that may be recorded by the system over multiple cycles is provided directly below in Table 2: Multiple Cycle Data (4 Forward Cycles). Along with the target speed, direction, and final destination determined at the beginning of a cycle, historical data (such as that shown in Table 2) may be made available to the speed-control system (e.g., referenced in, or retrieved from a data store) to allow the system to calculate speed adjustments.

TABLE 2

| Multiple Cycle Data (4 Forward Cycles) | | | | | | | | |
|---|---|---|---|---|---|---|---|---|
| Point of Interest | Cycle No. | Initial Est. Arrival | Section Est. Duration | Actual Arrival | Actual Section Duration | Updated Est. Arrival | Cycle Difference | Sector Difference |
| 1 | 1 | 07:03:00 | 00:03:00 | 7:03:10 | 00:03:10 | 07:03:00 | −0:00:10 | −0:00:10 |
| 1 | 2 | 07:03:00 | 00:03:00 | 7:03:11 | 00:03:11 | 07:03:00 | −0:00:11 | −0:00:11 |

TABLE 2-continued

| Multiple Cycle Data (4 Forward Cycles) | | | | | | | | |
|---|---|---|---|---|---|---|---|---|
| Point of Interest | Cycle No. | Initial Est. Arrival | Section Est. Duration | Actual Arrival | Actual Section Duration | Updated Est. Arrival | Cycle Difference | Sector Difference |
| 1 | 3 | 07:03:00 | 00:03:00 | 7:03:09 | 00:03:09 | 07:03:00 | −0:00:09 | −0:00:09 |
| 1 | 4 | 07:03:00 | 00:03:00 | 7:03:08 | 00:03:08 | 07:03:00 | −0:00:08 | −0:00:08 |
| 2 | 1 | 07:06:00 | 00:03:00 | 7:06:15 | 00:03:05 | 7:06:10 | −0:00:15 | −0:00:05 |
| 2 | 2 | 07:06:00 | 00:03:00 | 7:06:14 | 00:03:03 | 7:06:11 | −0:00:14 | −0:00:03 |
| 2 | 3 | 07:06:00 | 00:03:00 | 7:06:13 | 00:03:04 | 7:06:09 | −0:00:13 | −0:00:04 |
| 2 | 4 | 07:06:00 | 00:03:00 | 7:06:16 | 00:03:08 | 7:06:08 | −0:00:16 | −0:00:08 |

The averaging based on position along with an abundance of compiled records over several irrigation cycles will allow for the system to predictively adjust speeds and become more accurate over time. For example, if a system is traversing a hillside and during all previous cycles has a lagging average of arriving, at the point of interest, this historical average may move to compensate for the lag in time based upon that point of interest. As indicated above, when assessing recommended speed adjustments, parameters may be weighted and averaged using a variety of different techniques. Furthermore, calculations may be executed at each point of interest, at each section, or any other position between the starting location and the final destination.

Some of the above explanation may be further expounded the following example. A point of interest may include a position at 312.3 degrees, and the system may store records associated with that particular point of interest (e.g., a record may include the variance (V) in ft/min, and the direction of travel—either forward (F) or reverse (R)). Five example records at that particular point of interest may include: 0.10F, 0.11F, 0.10F, 0.08F, 0.09F and 0.03R, 0.04R, 0.04R, 0.06R, 0.06R. Based on the continual compilation of records, where L=lifetime, a lifetime average for the point of interest would be L.09F and L.04R. These lifetime averages may be used in various ways. For example, some of the records may be weighted differently, and in one example, the lifetime average receives a first weight and the last record receives a second weight, which is larger than the first weight. In one application, the system may apply a 0.3 weight to the lifetime average and a 0.7 weight to the last record to determine a speed adjustment factor. For example, using the above forward-direction records, (L.09F*.3)+(0.09F*.7)/2=Speed adjustment factor. The speed adjustment factor may then be used to adjust the speed of the irrigation system.

In another embodiment, the records may be used to detect a decline in reaching the desired points of interest on time, which may trigger a warning notification alerting that mechanical intervention may be required to repair or remove an obstacle or otherwise resolve an issue that may be preventing on-time arrivals. For example, a warning notification may be triggered if a variance, average variance, speed adjustment factor, or trend exceeds a predetermined threshold.

Figure 3:
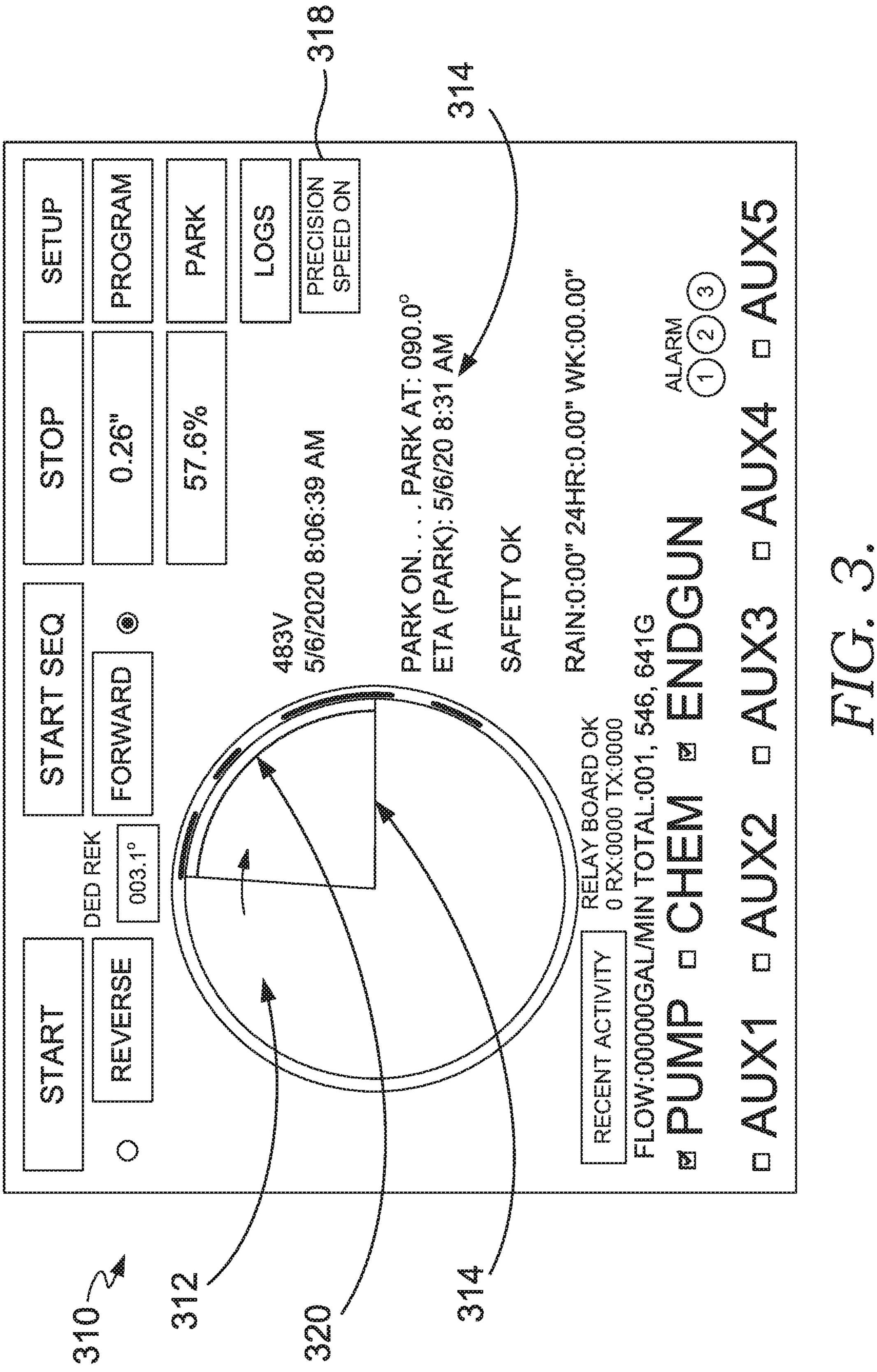
FIG. 3 depicts an example graphical user interface of an irrigation-system control panel in accordance with an aspect of this disclosure.

In a further embodiment, the speed-control system can receive input through a graphical user interface (GUI), which may be presented on a monitor or display of the control panel (e.g., control panel 60) or on a remote computing device that communicates with the control panel (e.g., mobile computing device, desktop, laptop, tablet, etc.). Referring to FIG. 3, FIG. 3 illustrates an example GUI 310 that can receive input and display information to a user. For example, the GUI 310 displays a circle 312 representing a field of interest, as well as an estimated arrival time 314 at a stop position 316. In addition, an icon 318 may visually indicate that a speed-control system is currently on, and an arc 320 along the circle 312 may visually indicate a section of the field along which the speed-control system is operating. In some instances, the GUI 310 may provide an "off" icon that, when selected, permits a user to turn off the speed-control system. For example, the speed-control system may be turned off when the icon 318 is selected, or an "off" icon may be displayed for selection when the icon 318 is selected.

In another embodiment, when multiple successive failures to achieve an arrival within an acceptable tolerance is computed, an alarm may be logged and subsequent routines or operations may be enabled. Examples of operations include stopping the irrigation system; shutting down the chemical applicator or similar additive device, auto-inflating the tires on the spans containing a low tire pressure reading; adjusting motor rotations per minute; logging a picture of the drivetrain and surrounding environment using system imagery; and other similar actions alerting of, or preventing system damage, recording system parameters or a decline in operational ability.

In another embodiment, a range of adjustment severity providing operational limits to the adjustments of the system may be provided. For example, the quantity of an adjustment may be categorized as lightly, moderately, aggressively, or similar categorizations, and the operational limit may be set using these categorizations. This operational limit may be pre-determined or set by a manufacturer, specified by a user, or any combination thereof. For example, when using an aggressive adjustment range, if the method computes a variance above a set threshold and therefore a steep decline in achieving an acceptable position on-time, a system's control signal output can be adjusted from a 20% duty cycle to a 60% duty cycle, or in other words, a very aggressive adjustment can be made to overcome the failure. In another example, this aggressive adjustment could also go the other way wherein the system's control signal output can be adjusted from 60% duty cycle to a 20% duty cycle. In any case, a range of adjustment would provide a range of adjustability wherein the system could not correct outside of the acceptable range, based upon any computed variance within the selected range of adjustment. Another range of adjustment could be selected in the event a more moderate, or even light range of adjustment, was desired.

In another embodiment, a user may desire to apply different operational limits based on the number of concurrent irrigation cycles. For example, a first cycle could apply a moderate speed adjustment and desired time to target whereas a second cycle, or a contiguous cycle after the first, could use an aggressive speed adjustment and second desired time to target. Among other things, this may allow multiple cycles to occur successively with the system adjusting each cycle differently. A plurality of cycles is contemplated along with the ability to program and direct the system's speed towards a positional target.

In a further embodiment, the speed-control system may include an option to allow the system to automatically compute time to complete a full revolution based on recorded data. In the case of a center pivot, a full revolution is considered traveling 360 degrees. In the case of a system that rotates less than 360 degrees, a revolution, or partial revolution due to the system rotation being less than 360 degrees, is considered to be starting from one barricade, or the starting location, and traveling to the other barricade, or the final destination. For a lateral move, length of run is used instead of revolution. This is the time to travel the distance the system can run until stopping, or the length of run. In any case, revolution time or length of run time is determined at full-speed which electrically is 100% duty cycle or always on. Thus, for any system 100% duty cycle can derive ground speed at 100%, application depth at 100% when other system parameters are known.

When computing time to complete a revolution, a theoretical speed may be calculated by using the drivetrain ratios, tire size, duty cycle, and similar inputs. However, using only these parameters, the theoretical fails to account for other factors, such as environmental effects, temperature, the effects of load adjustments during incline and decline, tire inflation and tire circumference under various loads or inflation pressures, mechanical appurtenances, soil disturbance, terrain, percent of grade, and similar hurdles within the field of interest. The present disclosure provides a mechanism for the actual speed to be determined, which can be used to supplement or update the theoretical calculations within the system increasing precision toward application depth efficiency.

Furthermore, this option may be used to clock, or make known, the actual speed of the system at 100% and record this result toward use throughout the system parameters. This can also be considered a calibration method because of the implication that speed has upon application depth, being a critical part of the system's intended use. This can be done at the first cycle or any subsequent cycle, or when a change has been made to the drivetrain, such as, but not limited to, replacing tires, replacing a motor, changing span length, adjusting the terrain percent of grade or leveling within the field layout, or any system change impacting the speed. A calibration function is contemplated to reside within the system controller.

In an embodiment, the method is used on a continuous move system, a system that has no duty cycle based movements but allows for continuous motion during an irrigation cycle. Based upon the computed variance, an electronic signal is increased or decreased to control the speed at which the system moves.

Figure 4:
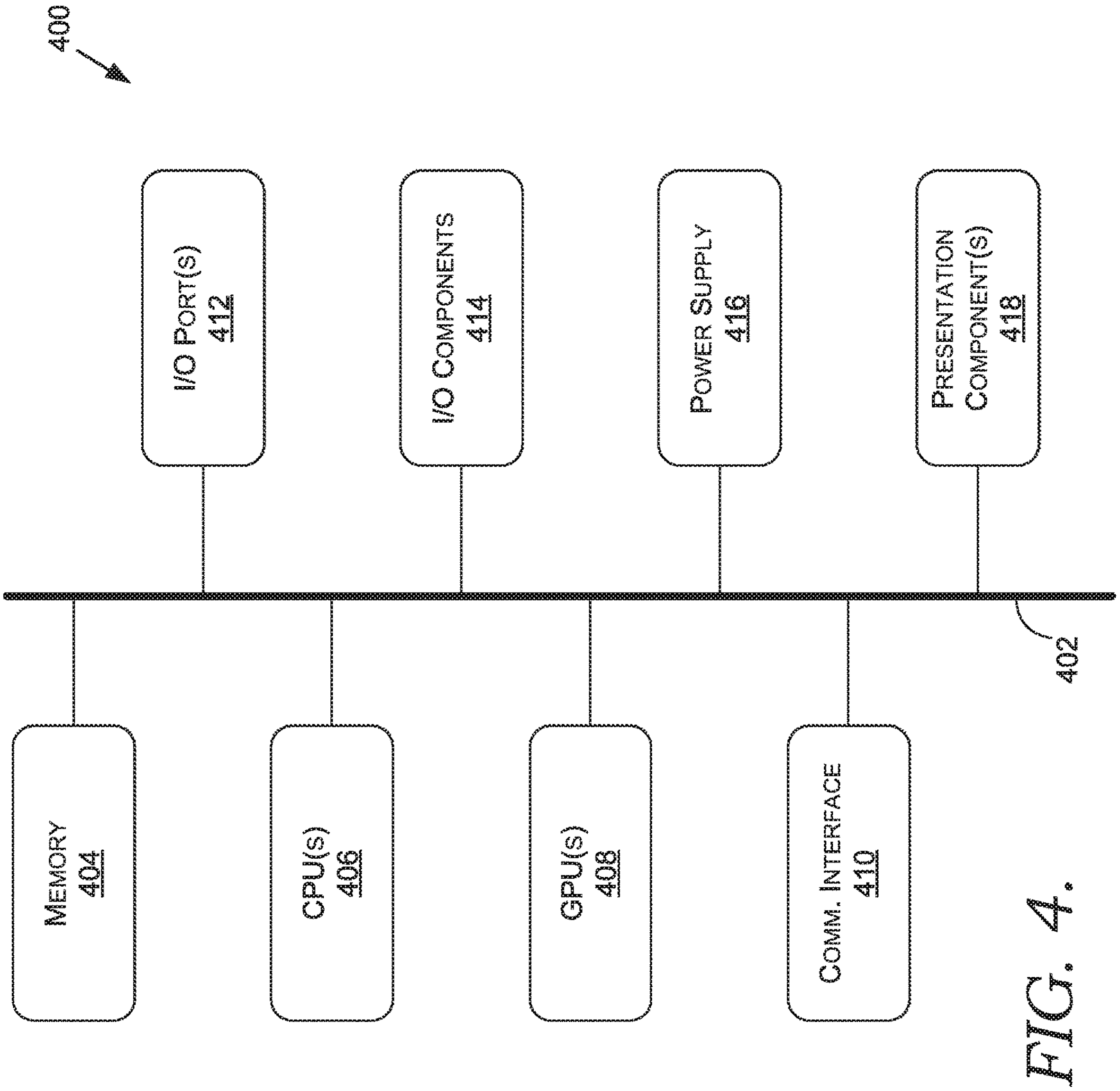
FIG. 4 depicts a block diagram of an example computing device that might be used to execute one or more methods or that might be part of a speed-control device in accordance with an aspect of this disclosure.

Referring to FIG. 4, FIG. 4 is a block diagram of an example computing device 400 suitable for use in implementing some embodiments of the present disclosure, such as the control panel 60, a device used to submit input to the control panel 60, or a device (e.g., server) that receives data from the control panel. Computing device 400 may include a bus 402 that directly or indirectly couples the following devices: memory 404, one or more central processing units (CPUs) 406, one or more graphics processing units (GPUs) 408, a communication interface 410, input/output (I/O) ports 412, input/output components 414, a power supply 416, and one or more presentation components 418 (e.g., display(s)).

Although the various blocks of FIG. 4 are shown as connected via the bus 402 with lines, this is not intended to be limiting and is for clarity only. For example, in some embodiments, a presentation component 418, such as a display device, may be considered an I/O component 414 (e.g., if the display is a touch screen). As another example, the CPUs 406 and/or GPUs 408 may include memory (e.g., the memory 404 may be representative of a storage device in addition to the memory of the GPUs 408, the CPUs 406, and/or other components). In other words, the computing device of FIG. 4 is merely illustrative. Distinction is not made between such categories as "workstation," "server," "laptop," "desktop," "tablet," "client device," "mobile device," "hand-held device," "electronic control unit (ECU)," "virtual reality system," and/or other device or system types, as all are contemplated within the scope of the computing device of FIG. 4.

The bus 402 may represent one or more busses, such as an address bus, a data bus, a control bus, or a combination thereof. The bus 402 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 404 may include any of a variety of computer-readable media. The computer-readable media may be any available media that may be accessed by the computing device 400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 404 may store computer-readable instructions (e.g., that represent a program(s) and/or a program element(s), such as an operating system), such as instructions for executing operations of a speed-control system, an irrigation system, or other operations associated with the control panel 60. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 400. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 406 may be configured to execute the computer-readable instructions to control one or more components of the computing device 400 to perform one or more of the methods and/or processes (e.g., processes in FIG. 5 and as described with respect to FIGS. 1-3) described herein. The CPU(s) 406 may each include one or more cores (e.g., one, two, four, eight, twenty-eight, seventy-two, etc.) that are capable of handling a multitude of software threads simultaneously. The CPU(s) 406 may include any type of processor, and may include different types of processors depending on the type of computing device 400 implemented (e.g., processors with fewer cores for mobile devices and processors with more cores for servers). For example, depending on the type of computing device 400, the processor may be an ARM processor implemented using Reduced Instruction Set Computing (RISC) or an x86 processor implemented using Complex Instruction Set Computing (CISC). The computing device 400 may include one or more CPUs 406 in addition to one or more microprocessors or supplementary co-processors, such as math co-processors.

The GPU(s) 408 may be used by the computing device 400 to render graphics (e.g., 3D graphics or the GUI 310 described with respect to FIG. 3). The GPU(s) 408 may include hundreds or thousands of cores that are capable of handling hundreds or thousands of software threads simultaneously. The GPU(s) 408 may generate pixel data for output images in response to rendering commands (e.g., rendering commands from the CPU(s) 406 received via a host interface). The GPU(s) 408 may include graphics memory, such as display memory, for storing pixel data. The display memory may be included as part of the memory 404. The GPU(s) 408 may include two or more GPUs operating in parallel (e.g., via a link). When combined together, each GPU 408 may generate pixel data for different portions of an output image or for different output images (e.g., a first GPU for a first image and a second GPU for a second image). Each GPU may include its own memory, or may share memory with other GPUs.

In examples where the computing device 400 does not include the GPU(s) 408, the CPU(s) 406 may be used to render graphics.

The communication interface 410 may include one or more receivers, transmitters, and/or transceivers that enable the computing device 400 to communicate with other computing devices via an electronic communication network, included wired and/or wireless communications. The communication interface 410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 412 may enable the computing device 400 to be logically coupled to other devices including the I/O components 414, the presentation component(s) 418, and/or other components, some of which may be built in to (e.g., integrated in) the computing device 400. Illustrative I/O components 414 include a microphone, mouse, keyboard, joystick, game pad, game controller, satellite dish, scanner, printer, wireless device, etc. The I/O components 414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 400. The computing device 400 may be include depth cameras, such as stereoscopic camera systems, infrared camera systems, RGB camera systems, touchscreen technology, and combinations of these, for gesture detection and recognition. Additionally, the computing device 400 may include accelerometers or gyroscopes (e.g., as part of an inertia measurement unit (IMU)) that enable detection of motion. In some examples, the output of the accelerometers or gyroscopes may be used by the computing device 400 to render immersive augmented reality or virtual reality.

The power supply 416 may include a hard-wired power supply, a battery power supply, or a combination thereof. The power supply 416 may provide power to the computing device 400 to enable the components of the computing device 400 to operate.

The presentation component(s) 418 may include a display (e.g., a monitor, a touch screen, a television screen, a heads-up-display (HUD), other display types, or a combination thereof), speakers, and/or other presentation components. The presentation component(s) 418 may receive data from other components (e.g., the GPU(s) 408, the CPU(s) 406, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

Figure 5:
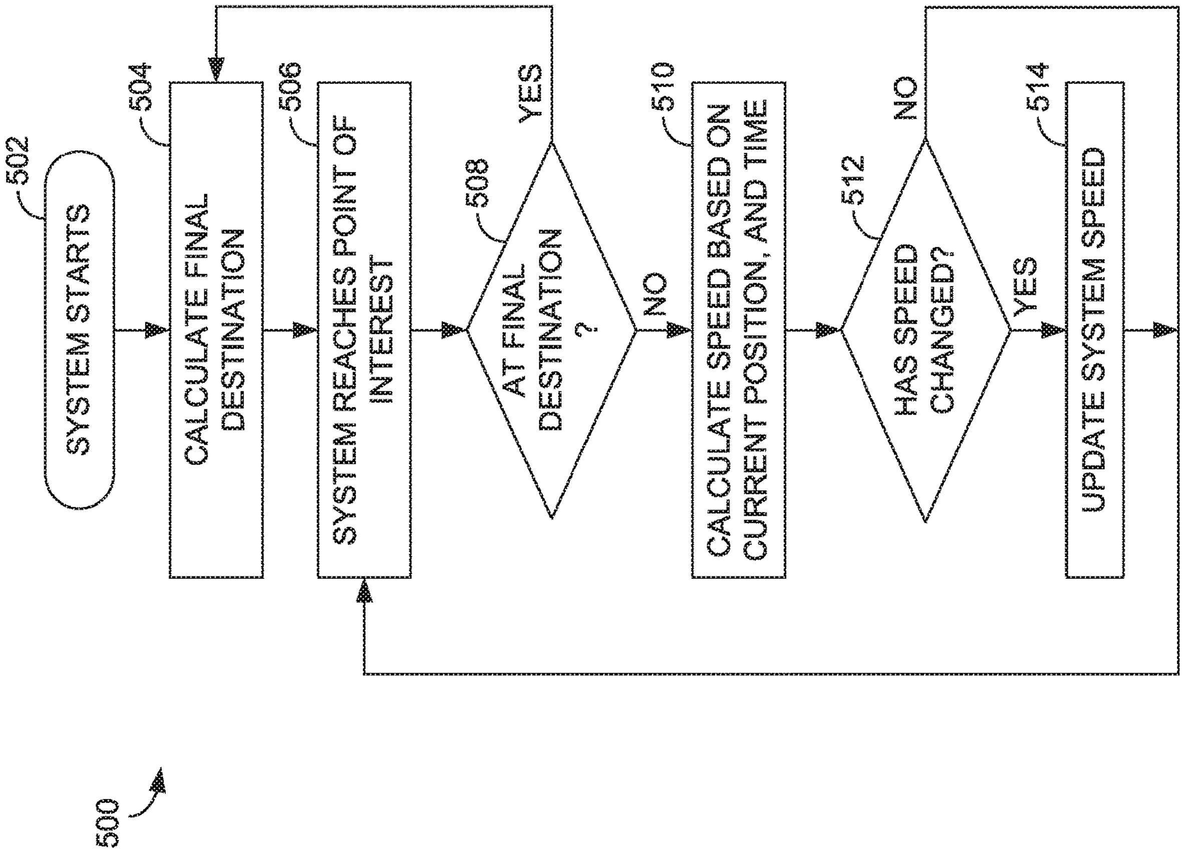
FIGS. 5 and 6 each depicts a flow diagram of steps that might be performed in accordance with an aspect of this disclosure.
Figure 6:
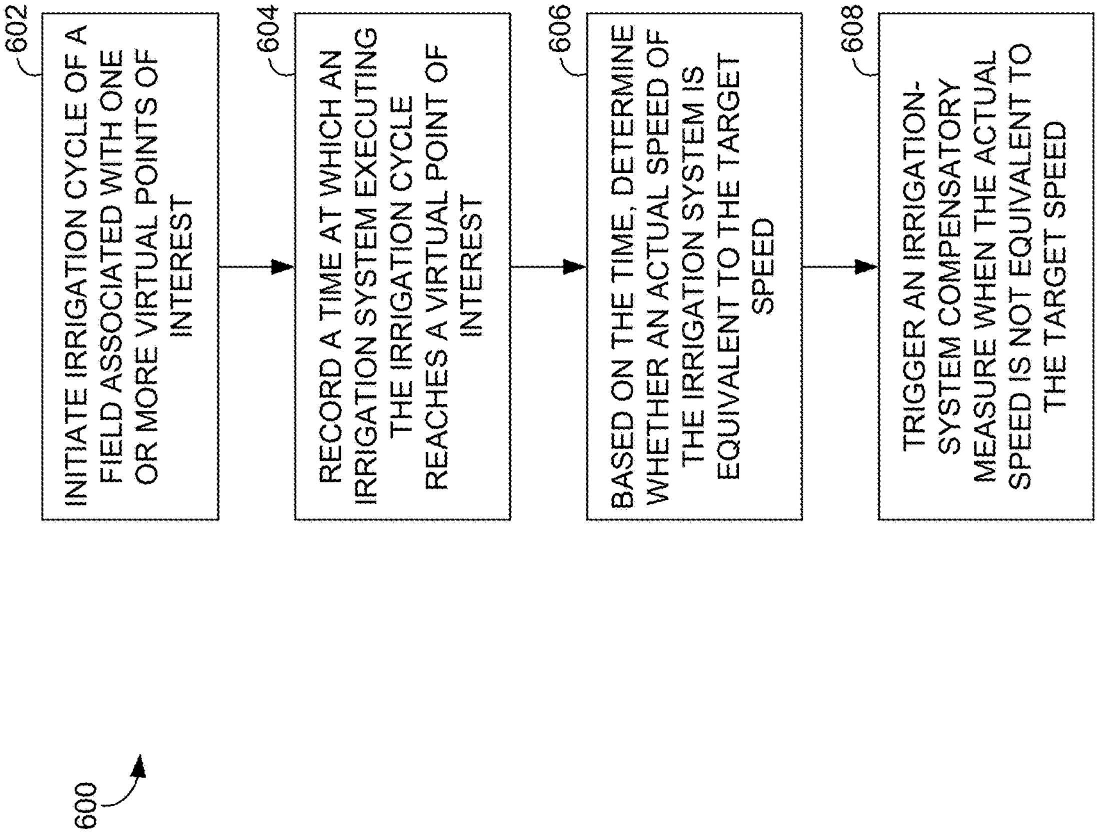

Referring now to FIGS. 5 and 6, flow diagrams depict steps of methods 500 and 600 that may be performed in accordance with an aspect of the present disclosure. One or more of the blocks of the methods 500 and 600 may comprise a computing process or operation that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods 500 and 600 may be described, by way of example, with respect to the speed-control system and components described in FIGS. 1-4. However, these methods 500 and 600 may additionally or alternatively be executed by any one system, or any combination of systems, including, but not limited to, those described herein.

FIG. 5 is a flow diagram showing a method 500 for adjusting a speed of an irrigation system, in accordance with some embodiments of the present disclosure. The method 500, at block 502, includes the speed-control system starting. For example, once inputs have been provided to the system (e.g., through the control panel 60) and the system has determined a target speed, movement direction (e.g., forward or reverse), final destination, and relevant historical data (if necessary in accordance with the particular mode of the system), a "start" input may be received (e.g., as a result of a user selecting the "start" button depicted in FIG. 3).

The method 500, at block 504, includes calculating a final destination. For example, the system may determine an estimated time at which the irrigation system is predicted to arrive at a final destination (e.g., 220 or 214 in FIG. 2). Although not depicted in FIG. 5, the system may also determine estimated times of arrival for one or more points of interest between the starting position and the final destination (e.g., 216, 218*a*, 218*b*, or any combination thereof).

The method 500, at block 506, includes the irrigation system reaching a point of interest. For example, the irrigation system 110 may reach one of the points of interest 216 in FIG. 2. At block 508 the method determines whether the point of interest is a final destination. If yes, then the method restarts, such as at block 504. If no, then the method proceeds to block 510, including calculating a speed based on the current position and current time.

The method 500, at block 512, includes determining whether the speed has changed based on the speed calculated at step 510 and the target speed determined when the system started. If the speed has not changed, then the method proceeds back to block 506, including the system reaching another point of interest. If the speed has changed, then the method 500, at block 514, adjusts the speed (e.g., increasing speed or decreasing speed).

FIG. 6 is a flow diagram showing a method 600 for adjusting a speed of an irrigation system, in accordance with some embodiments of the present disclosure. The method 600, at block 602, includes initiating an irrigation cycle of a field associated with one or more virtual points of interest. In an aspect of the disclosure, a target speed is associated with the irrigation cycle. For example, FIG. 2 includes a depiction 210 schematically representing a field associated with virtual points of interest 216. Once inputs have been provided to the system (e.g., through the control panel 60), the system may determine a target speed, such as based on an application rate provided as input. In addition, an irrigation cycle may be initiated in response to receiving a "start" input, such as a result of a user selecting the "start" button 318 depicted in FIG. 3. For example, the control panel 60 may send a signal to the irrigation system triggering the irrigation system to start the cycle.

The method 600, at block 604, includes recording a time at which an irrigation system executing the irrigation cycle reaches a virtual point of interest of the one or more virtual points of interest. For example, an instant in time (e.g., 07:12:53 AM or 00 hr:12 min:53 sec) at which the irrigation system reaches (or is deemed to reach by the control panel 60 or other system components) one of the virtual points of interest 216 may be recorded to memory. In some instances, the virtual point of interest may be associated with an application rate that determines (e.g., is used to calculate) the target speed.

The method 600, at block 606, includes based on the time, determining whether an actual speed of the irrigation system at the virtual point of interest is equivalent to the target speed. For example, a variance can be calculated based on the time and a predicted or estimated time. Various examples of variance-related calculations and data are provided in Table 1 and Table 2. Based on the variance, a determination may be made as to whether the actual speed is equivalent to the target speed. "Equivalent" may be based on a distance/time (e.g., feet per minute) rounded to a specified significant decimal (e.g., 6 feet per minute) or within a threshold of a target speed (e.g., +/−20% or 15% or 10% or 5%) or based on any other known mathematical operation(s) that might be used to determine whether two or more parameters are within an acceptable tolerance or range of one another. The approach used to determine whether an actual speed is close enough to a target speed may be selected based on an objective of adherence to a prescribed application rate. For example, a tolerance or threshold may be selected based on the actual speed falling within that tolerance or threshold still allowing for a prescribed application rate to be achieved.

The method 600, at block 608, includes triggering an irrigation-system compensatory measure when the actual speed is not equivalent to the target speed. For example, when the actual speed is not equivalent to the target speed, the speed may be increased or decreased accordingly. In other instances, a notification may be sent to a user, displayed on the control panel, or a combination thereof. Moreover, a flow rate of the application may be adjusted. Further still, the system may be halted to permit inspection. These are just some examples of compensatory measures, and various others are also possible, and compensatory measures may be taken independently or in combination (e.g., adjust speed and send a notification).

From the foregoing, it will be seen that this subject matter is well adapted to attain all the ends and objects hereinabove set forth together with other advantages, which are obvious and which are inherent to the structure. It will be understood that certain features and subcombinations are of utility and might be employed without reference to other features and subcombinations. This is contemplated by and is within the scope of the claims. Since many possible alternative versions of the subjected matter might be made without departing from the scope thereof, it is to be understood that all matter herein set forth or shown in the accompanying drawings is to be interpreted as illustrative and not in a limiting sense.

The invention claimed is:

1. A computer-implemented method comprising:

initiating an irrigation cycle of a field associated one or more virtual points of interest, wherein a target speed is associated with the irrigation cycle;

recording, prior to reaching a final destination, a first time at which an irrigation system executing the irrigation cycle reaches a virtual point of interest of the one or more virtual points of interest, wherein the virtual point of interest comprises an angular increment associated with the field or a linear increment associated with the field;

based on the first time, determining whether an actual speed of the irrigation system is equivalent to the target speed, wherein the determining is based at least partially on a historical record that is associated with the virtual point of interest and that includes a second time duration associated with the irrigation system previously reaching the virtual point of interest during a previous irrigation cycle; and triggering an irrigation-system compensatory measure when the actual speed is not equivalent to the target speed, wherein the irrigation-system compensatory measure includes adjusting a first duty cycle of the irrigation system to a second duty cycle according to an operational limit, which limits an amount of change permitted to be effected in association with the irrigation-system compensatory measure, and wherein the operational limit is a light adjustment, a moderate adjustment, or an aggressive adjustment; and wherein the moderate adjustment is more than the light adjustment and less than the aggressive adjustment.

2. The computer-implemented method of claim 1, wherein the determining is based on an average of multiple historical time durations associated with the virtual point of interest; and wherein each historical time duration comprises a respective time duration associated with the irrigation system previously reaching the virtual point of interest during a respective previous irrigation cycle.

3. The computer-implemented method of claim 1, wherein the determining is based on a record that is associated with a preceding virtual point of interest of the field and that includes a third time at which the irrigation system reached the preceding virtual point of interest during the irrigation cycle.

4. The computer-implemented method of claim 1, wherein the determining is based on an average of times recorded over a plurality of virtual points of interest of the field during the irrigation cycle.

5. The computer-implemented method of claim 1, wherein the irrigation-system compensatory measure includes adjusting a speed of the irrigation system.

6. The computer-implemented method of claim 1, wherein the irrigation-system compensatory measure includes adjusting a flow rate associated with the irrigation system.

7. The computer-implemented method of claim 1, wherein the irrigation-system compensatory measure includes transmitting a notification.

8. The computer-implemented method of claim 1, wherein the determining is based one or more times recorded at one or more points of interest, and wherein the determining includes applying a higher weight to a more recently recorded time and applying a lower weight to a less recently recorded time.

9. The computer-implemented method of claim 1 further comprising, calculating an estimated arrival time at which the irrigation system is predicted to arrive at a destination, wherein the calculating the estimated arrival time includes increasing a speed-based time by an estimated duration of a system transition.

10. The computer-implemented method of claim 1, wherein the operational limit comprises the aggressive adjustment that increases the first duty cycle by a first multiple of 3× to the second duty cycle.

11. The computer-implemented method of claim 10, wherein the method further comprises, in a subsequent irrigation cycle, adjusting the second duty cycle to a third duty cycle based on a second operational limit, which includes the light adjustment or the moderate adjustment that changes the second duty cycle to the third duty cycle by a lower multiple than the first multiple.

12. The computer-implemented method of claim 1, wherein the determining includes calculating a variance between the time and an estimated time at which the irrigation system is predicated to arrive at the point of interest.

13. The computer-implemented method of claim 1, wherein the target speed is a first target speed derived from a first application rate associated with the irrigation cycle; wherein the irrigation cycle includes a second target speed that is different from the first target speed and is derived from a second application rate associated with the irrigation cycle; and wherein the method further comprises:

recording a fourth time at which the irrigation system executing the irrigation cycle reaches a second virtual point of interest of the one or more virtual points of interest;

based on the fourth time, determining whether an actual speed of the irrigation system is equivalent to the second target speed; and triggering an irrigation-system compensatory measure when the actual speed is not equivalent to the second target speed.

14. A system comprising:

one or more processing devices and one or more memory devices communicatively coupled to the one or more processing devices storing programmed instructions thereon, which when executed by the one or more processing devices causes performance of operations comprising:

initiating an irrigation cycle of a field associated with one or more virtual points of interest, wherein a first target speed is associated with the irrigation cycle;

recording, prior to reaching a final destination, a first time at which an irrigation system executing the irrigation cycle reaches the virtual point of interest of the one or more virtual points of interest, wherein the virtual point of interest comprises an angular increment associated with the field or a linear increment associated with the field;

based on the time, determining whether an actual speed of the irrigation system is equivalent to the first target speed; and triggering an irrigation-system compensatory measure when the actual speed is not equivalent to the target speed, wherein the irrigation-system compensatory measure includes adjusting the first target speed to a second target speed, which is based on a historical record that is associated with the virtual point of interest and that includes a second time associated with a prior cycle in which the irrigation system previously reached the virtual point of interest.

15. The system of claim 14, wherein the operations further comprise:

retrieving historical data that includes the historical record and that is associated with the virtual point of interest.

16. The system of claim 14, wherein the operations further comprise:

presenting a graphical user interface including a first representation of the field, a second representation of a position of the irrigation system relative to the field, a third representation of a point of interest, and a notification that the system is configured to trigger the irrigation-system compensatory measure when the actual speed is not equivalent to the first target speed.

17. The system of claim 16, wherein the first representation of the field includes a circle and the notification includes a presentation of an arc along the circle, the arc extending between the second representation and the third representation.

18. A computer-implemented method comprising:

initiating an irrigation cycle of a field associated with one or more virtual points of interest, wherein a target speed is associated with the irrigation cycle;

recording, prior to reaching a final destination, a first time at which an irrigation system executing the irrigation cycle reaches a virtual point of interest of the one or more virtual points of interest, wherein the virtual point of interest comprises an angular increment associated with the field or a linear increment associated with the field;

based on the first time, determining whether an actual speed of the irrigation system at the virtual point of interest is equivalent to the target speed, wherein the target speed is based on a historical record that is associated with the virtual point of interest and that includes a second time duration associated with a prior cycle in which the irrigation system previously reached the virtual point of interest; and adjusting the actual speed of the irrigation system to an adjusted actual speed when the actual speed is not equivalent to the target speed.

19. The computer-implemented method of claim 18 further comprising, recording a third time at which the irrigation system executing the irrigation cycle reaches a second virtual point of interest of the one or more virtual points of interest;

based on the third time, determining whether an actual speed of the irrigation system at the second virtual point of interest is equivalent to the second target speed; and adjusting the actual speed of the irrigation system at the second virtual point of interest to a second adjusted speed when the actual speed is not equivalent to the second target speed.

20. The computer-implemented method of claim 18, wherein the second time duration is a time differential, and wherein the target speed is based on an average of the time differential and one or more additional time differentials from one or more additional historical records.

* * * * *